(12) United States Patent
Nolting et al.

(10) Patent No.: US 9,530,257 B2
(45) Date of Patent: Dec. 27, 2016

(54) METHOD, DEVICE AND SYSTEM FOR THE REALIZATION OF AN APPLICATION PROGRAM FOR A VEHICLE

(71) Applicant: Volkswagen Aktiengesellschaft, Wolfsburg (DE)

(72) Inventors: Michael Nolting, Hannover (DE); Teodor Buburuzan, Braunschweig (DE); Andreas Ebert, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 14/600,820

(22) Filed: Jan. 20, 2015

(65) Prior Publication Data

US 2015/0142253 A1 May 21, 2015

Related U.S. Application Data

(63) Continuation of application No. PCT/EP2013/006419, filed on Jul. 4, 2013.

(30) Foreign Application Priority Data

Jul. 20, 2012 (DE) ........................ 10 2012 014 362

(51) Int. Cl.
*G07C 5/08* (2006.01)
*G06Q 10/04* (2012.01)
*G06Q 30/02* (2012.01)
*G07C 5/00* (2006.01)
*G06Q 10/00* (2012.01)

(52) U.S. Cl.
CPC ........... *G07C 5/0841* (2013.01); *G06Q 10/047* (2013.01); *G06Q 10/20* (2013.01); *G06Q 30/02* (2013.01); *G07C 5/008* (2013.01)

(58) Field of Classification Search
CPC ..... G07C 5/0841; G07C 5/008; G06Q 10/047; G06Q 30/02; G06Q 10/20; G08G 1/20
See application file for complete search history.

(56) References Cited

U.S. PATENT DOCUMENTS

| 2003/0052796 | A1 | 3/2003 | Schmidt et al. |
| 2003/0109972 | A1* | 6/2003 | Tak ................................ 701/29 |
| 2003/0182032 | A1* | 9/2003 | McWalter et al. .............. 701/29 |
| 2004/0267410 | A1 | 12/2004 | Duri et al. |

(Continued)

FOREIGN PATENT DOCUMENTS

| CN | 1603748 A | 4/2005 |
| DE | 10 2009 054 292 A1 | 8/2011 |

(Continued)

OTHER PUBLICATIONS

Lee et al., "A Smart Web Platform for Telematics Services toward Ubiquitous Environments," IEEE Geosci. & Remote Sensing Symp. IGARSS, vol. 3, pp. 1576-1579 (Jul. 25, 2005).

*Primary Examiner* — Rodney Butler
(74) *Attorney, Agent, or Firm* — Barnes & Thornburg LLP

(57) ABSTRACT

In order to realize at least one application program for a vehicle, data of the vehicle is transmitted by the vehicle to an administrative unit via a wireless interface. Each application program acquires the data of the vehicle from the administrative unit via an interface of the administrative unit. Each application program thus executes a function in accordance with the data.

18 Claims, 2 Drawing Sheets

(56) References Cited

U.S. PATENT DOCUMENTS

| | | |
|---|---|---|
| 2005/0165514 A1* | 7/2005 | Kamdar et al. .................. 701/2 |
| 2006/0129309 A1 | 6/2006 | Alewine et al. |
| 2009/0287369 A1 | 11/2009 | Nielsen |
| 2011/0015998 A1 | 1/2011 | Hirschfeld |
| 2013/0024060 A1* | 1/2013 | Sukkarie ................ H04L 67/12 701/22 |
| 2014/0164579 A1* | 6/2014 | Douthitt ................ G07C 5/008 709/219 |

FOREIGN PATENT DOCUMENTS

| | | |
|---|---|---|
| EP | 1 128 333 A2 | 8/2001 |
| EP | 1 385 126 A1 | 1/2004 |
| WO | WO 2011/147893 A1 | 12/2011 |

\* cited by examiner

METHOD, DEVICE AND SYSTEM FOR THE REALIZATION OF AN APPLICATION PROGRAM FOR A VEHICLE This nonprovisional application is a continuation of International Application No. PCT/EP/2013/064195, which was filed on Jul. 4, 2013, and which claims priority to German Patent Application No. DE 10 2012 014 362.1, which was filed in Germany on Jul. 20, 2012, and which are both herein incorporated by reference.

BACKGROUND OF THE INVENTION

Field of the Invention

The present invention relates to a method, a device, and a system for realizing different application programs (apps) for a vehicle.

Description of the Background Art

US 2011/0015998 A1 describes an automatic updating of status information depending on the vehicle diagnostic data.

DE 10 2009 054 292 A1 discloses a parking guiding system in which the vehicle releasing a parking place sends a release with the position.

Proprietary solutions are known according to the state of the art, in which vehicle data are supplied by the vehicle to a system, which then executes a certain function depending on said vehicle data. It is problematic in this case, for example, that each vehicle must send the vehicle data in a specific manner to the particular system, so that the system can correctly acquire and process these vehicle data.

SUMMARY OF THE INVENTION

It is therefore an object of the present invention to provide and to simplify the realization of such application programs or applications (apps), so that, for example, third-party providers as well can create application programs in a simple manner, without having to have the necessary knowledge on the manner in which a certain vehicle transmits its vehicle data, and without the particular vehicle having to be adapted in any way to a new application program.

A method for realizing at least one application program, particularly a number of different application programs, for a vehicle is provided. In this regard, vehicle data are transmitted via a wireless interface or radio interface from the vehicle to a management unit located outside the vehicle. Each application program acquires the vehicle data from the management unit via the same management unit interface. Each application program then executes a function depending on the data acquired from the management unit.

In other words, none of the application programs have direct communication with the vehicle, but work with the data that is made available to the particular application program via a defined interface via the management unit, for example, a special server. As a result, advantageous application programs or applications can also be programmed by third-party providers, if the defined interface is accessible publicly via the internet, for example, particularly together with a runtime environment. The invention thus makes it possible that different application programs can access the data of individual vehicles via the defined interface and utilize these data for the realization of specific functions.

In this regard, particularly each vehicle user of a vehicle using one of the application programs, has access authorization for accessing the data. With the proper access authorization, the respective application program logs onto the management unit via the defined interface before access to the vehicle data.

This assures that each application can only access the data of the individual vehicle when the vehicle user or driver of said vehicle has previously provided access authorization or approval for access to the data of his vehicle to the respective application. The management unit checks whether the particular application has the proper access authorization and provides the particular application with the desired vehicle data only when the particular application has successfully established the proper access authorization.

In this regard, the access authorization can be configured by a vehicle user, so that, for example, it can also be configured which vehicle data may be used by the particular application. The collection and sending of vehicle data to the management unit can also be implicitly configured thereby. Stated differently, the management unit tells the vehicle which data are needed, and the vehicle collects and sends only the needed data to the management unit.

The owner or user of the vehicle thereby retains control as to what vehicle data or information he makes available to a particular application. This allows for the same information to also be provided to a number of application programs or applications.

In an embodiment, one of the application programs during the execution of its function can generate additional data depending on the data the application program has acquired from the vehicle via the management unit. These additional data can then be sent from the application program to the management unit, whereby the management unit transmits these additional data to the particular vehicle.

Because the additional data are sent from the management unit to the vehicle, an interface by which external services or application programs can reach the vehicle exists in the management unit as it were. To this end, it is not necessary (and also not desirable) for the respective application programs to know which vehicle is explicitly involved. In other words, the management unit conceals the information on the particular vehicle from the application program.

Thus, for example, the following information can be sent or transmitted as additional data to the vehicle: A character string. General status information, for example, a parking garage recommendation, can be sent to the driver of the vehicle by the character string. Such a character string can be a character string with a predefined maximum length (e.g., 40 characters) that is presented to the driver in a suitable way, for example, via the multi-functional display or on the infotainment of the vehicle; A navigation destination, i.e., a destination of a route to be driven by the vehicle. For example, an external service or application program could determine the navigation and/or intermediate destinations and send them to the vehicle. Expediently these navigation and/or intermediate destinations must be confirmed accordingly by the vehicle's driver before the route to be driven by the vehicle is determined depending on these destinations; Point of interest, i.e., a position of a specific place, particularly with additional information about this location. For example, an application program could input such points of interest together with additional information on a map of a navigation system of the vehicle; A music recommendation. For example, depending on the position of the vehicle and/or on the time of day, application programs could transmit specific music recommendations to the vehicle; A talk burst. In a similar way, application programs could transmit specific talk bursts (e.g., messages) particularly depending on the vehicle's position; and/or Binary data. For example, videos or music can be transmitted in the form of binary data.

To register, each application program before a first execution of the function of the particular application program should transmit at least one (optimally all) of the following information to the management unit: The type of vehicle data in which the particular application program is interested (for example, the vehicle's parking place and the vehicle's parking time); The type of vehicle data the particular application program sends via the management unit to the vehicle (for example, a suggestion for a parking garage or for a parking place for the vehicle); A description of the application program for the vehicle user. Thus, the management unit can pass on the corresponding description to interested vehicle users; A start-up or launch option for the application program, whereby the application program can be started or executed by the vehicle user using said start-up or launch option (e.g., a URL); and/or A mechanism by which the vehicle user can be identified by the application program. For example, the particular vehicle user can be identified by an identifier or a user name and a password in regard to the specific application program. For this purpose, technologies should logically be used that do not require the relevant passwords for the application program having to be stored in the management unit.

After successful registration, which can also comprise an internal manual check of the service, the relevant application program can receive, for example, a computer-generated key with the help of which the specific application program can then retrieve vehicle data via the management unit.

The vehicle data transmitted from the vehicle to the management unit can be data selected from the following group: The current position of the vehicle. Said position can be transmitted with a predefined degree of accuracy, so that an application program can acquire the position of the vehicle very precisely or only approximately; The current speed of the vehicle. Said speed can also be transmitted with a predefined degree of accuracy, so that an application program is only informed, for example, whether the vehicle is stationary or moving, or so that an application program can acquire a very precise vehicle speed value; A starting position of the vehicle, whereby this is understood to be, for example, the starting point of a route to be traveled by the vehicle; A destination position of the vehicle, whereby this is understood to be, for example, the endpoint of a route to be traveled by the vehicle; A parking position of the vehicle. The parking position of the vehicle corresponds particularly to the position of the vehicle with the additional information that the vehicle is parked, which can be determined, for example, from the fact that the vehicle is locked; An estimated time of arrival of the vehicle, determined by the vehicle's navigation system, for example, based on the route traveled by the vehicle; Data on a route traveled by the vehicle. These data can be determined, for example, via an odometer of the vehicle based on the rotations of a vehicle wheel; The vehicle's tank fuel level; An operating state of the vehicle's hazard light. An application program can determine from this operating state, for example, whether or not the vehicle's hazard light is currently activated; and/or Data collected in a system of the vehicle. These can be data in the CAN bus. Examples of these data comprise the speed, the tank fuel level, and information on the use of the vehicle's driver assistance systems.

Certain functions are listed below as an example of a function executed by an application program: A search function to find a current position (parking position) of the vehicle. This search function is also known as the so-called car finder. The last or current parking position of the vehicle is communicated to the search function via the management unit; the driver of the vehicle can then determine said position by the suitable application program, for example, via the internet; A driver's log book function to create a driver's log book for the vehicle. The specific position of the vehicle is communicated to the driver's log book function via the management unit, so that the log book function based on these positions together with the corresponding time stamp can create a log book, which can then be retrieved by the driver on the internet, for example; A Twitter function to send messages depending on the current position of the vehicle. For example, an application program operating with said Twitter function could send the following message when driving through a certain area: "I just left the parking lot and will be home in 20 minutes;" A statistics function which records when, where, and how the vehicle was driven. To realize this statistics function, the current position and the current speed of the vehicle could be determined by the specific application program via the management unit, for example; A parking place recommendation function, which recommends a parking place depending on the current position of the vehicle. The corresponding application program based on the current position of the vehicle could monitor, for example, when the vehicle has driven beyond a predefined boundary or enters a specific area, in order to then transmit the recommendation for a specific parking garage to the vehicle depending on the current traffic situation and parking garage occupancy; A traffic jam warning function, which depending on the current position of the vehicle and depending on traffic information sends warning messages about a jam to the vehicle; A parking place search function, which depending on a time of arrival at a specific destination identifies a parking place in the vicinity of the destination and transmits the information on this parking place to the vehicle; A location search function, which depending on predetermined search criteria and depending on the current position of the vehicle determines intermediate destinations or points of interest, which are transmitted to the vehicle in order to be displayed on the map of the vehicle's navigation system; A travel guide function, which depending on the current vehicle position provides the vehicle with information (e.g., short descriptions) on places located in the vicinity of the vehicle's current route; A tank monitoring application, which permanently monitors the tank fuel level of the vehicle and particularly depending on the tank fuel level in combination with information on gas stations (e.g., from the internet) provides the user with refueling recommendations (e.g., location of a gas station). The user can thereby reasonably fill the tank and has a good control of costs; and/or A telemetry application, which analyzes vehicle data and depending thereon compiles information on driving behavior (e.g., economical, fast, environmentally friendly, treating vehicle considerately) and outputs it to the user. The vehicle data can comprise thereby the revolutions per minute, steering wheel angle, the speed of the vehicle, ABS use, torque, the currently engaged gear, and fuel consumption.

Moreover, external services depending on the current vehicle position can display hotels with the best ratings, show restaurants of a specific type, or inform the vehicle about to-do lists, as soon as the vehicle is in the vicinity of a specific location.

According to an embodiment of the invention, data from any components of the vehicle such as from the navigation system and from the infotainment system, for example (e.g., also from applications running on the driver's cellular telephone that is connected to the infotainment system) are also regarded as vehicle data that can be transmitted to the management unit. Application programs can then query these vehicle data in the management unit in order to work with them.

A device 20 for a vehicle is also provided. In this regard, the device can include a controller 6 and a wireless interface 7. The wireless interface can be configured to send vehicle data and to receive additional data. The controller can be configured to acquire automatically the vehicle data from the vehicle and depending on the additional data received via the wireless interface 7, to send them via the wireless interface 7.

For example, it is possible in this case that the type of vehicle data to be acquired by the device from the vehicle and then sent via the wireless interface is predetermined for the device with the help of the additional data, which the device receives via the wireless interface.

A management unit for a vehicle is also provided. In this regard, the management unit comprises a controller, a wireless interface, and an additional interface. The management unit acquires vehicle data via the wireless interface. The additional interface of the management unit is configured in such a way that (particularly different) application programs can access the vehicle data via this additional interface.

Moreover, according to an embodiment of the invention a system can be provided that comprises a management unit and one or more devices of the invention.

Also, a vehicle is provided that comprises the device of the invention.

The present invention provides a future-proof manner for external services (application programs) to acquire vehicle data from a vehicle and to send data to a vehicle in order to display these in the vehicle in any fashion. Because the vehicle data are provided via the management unit to the application program and because the data are sent in a similar way to the vehicle via the management unit, new application programs do not require on-board changes in regard to the vehicle's hardware or software.

The driver can set and configure the access to his vehicle data via the internet (via a web interface). The driver can thereby indicate the vehicle data that are sent to the management unit and the vehicle data that are provided via the management unit to an external service. The authorization of external services with respect to access to vehicle data can also occur as taught by the invention.

The present invention is particularly suitable for use in motor vehicles. Of course, the present invention is not limited to this preferred field of application, because the present invention can also be used in ships, airplanes, and rail-mounted or track-guided vehicles. Likewise, the present invention could be used in bicycles or electric bikes. These bicycles could send data (e.g., the current GPS position) to the management unit. Depending on these GPS positions, the route of the individual bicycle could be determined and depending on this the schedule of buses could be optimized.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
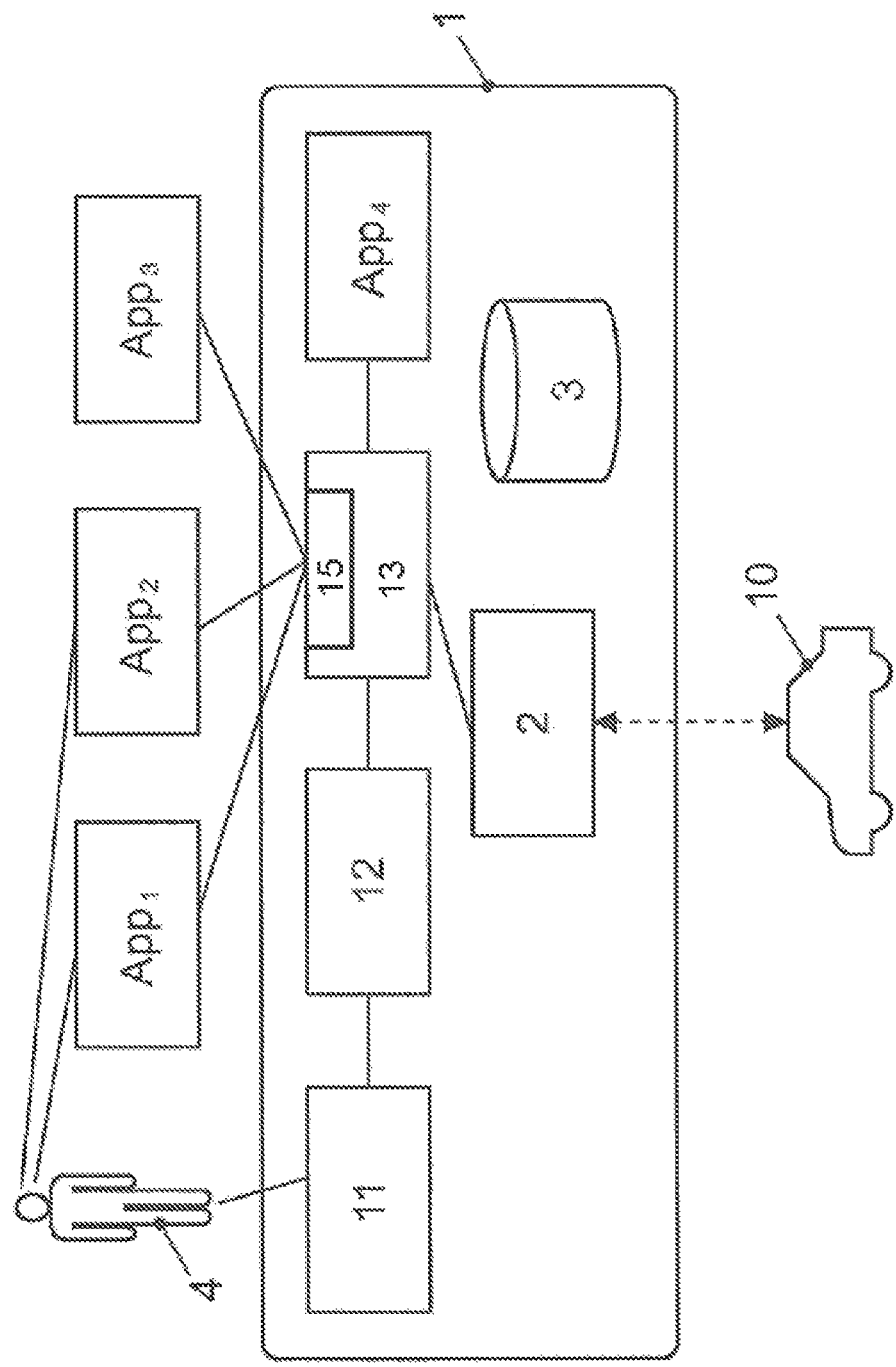
FIG. 1 illustrates schematically how different application programs access vehicle data via the management unit according to an embodiment of the invention.
Figure 2:
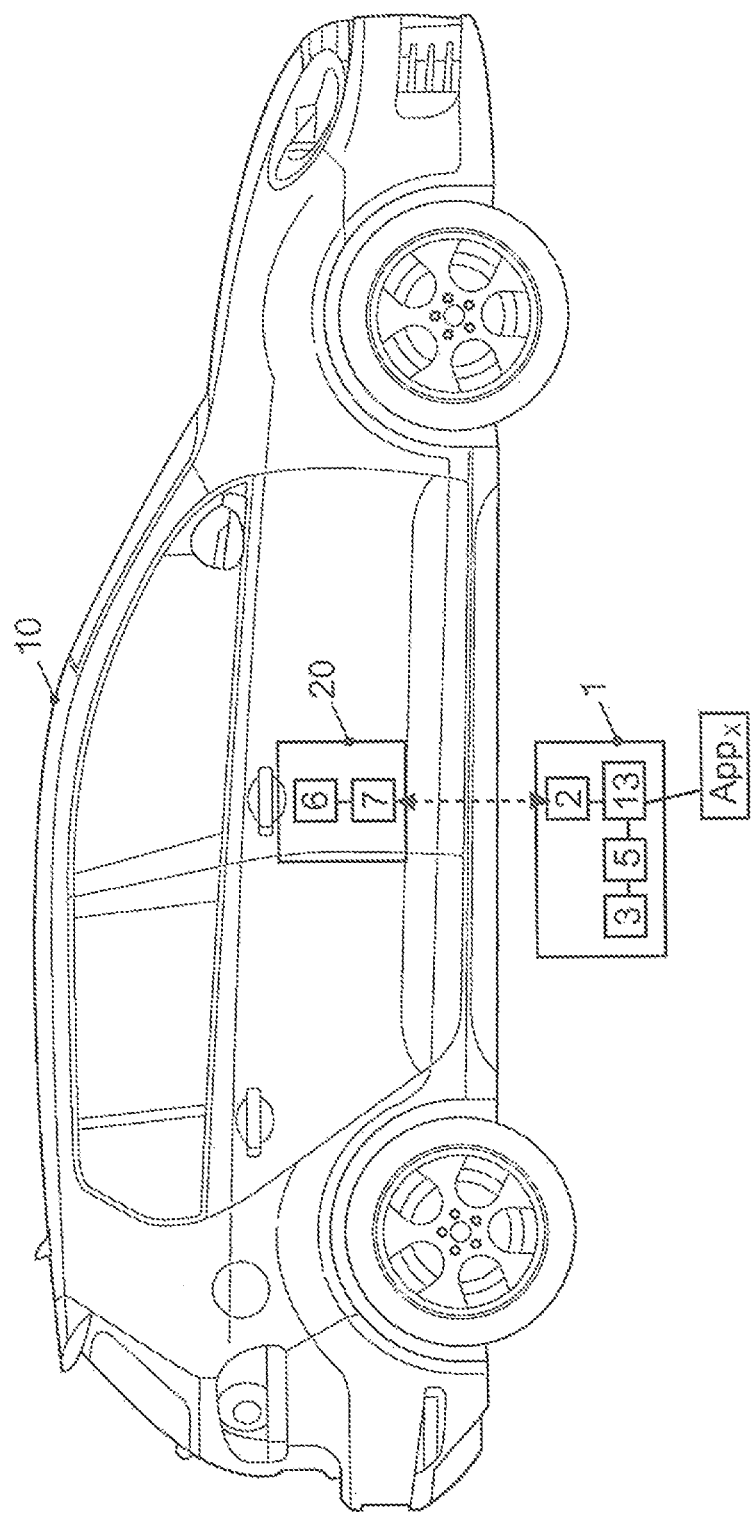
FIG. 2 illustrates a vehicle with a device according to an embodiment of the invention, which exchanges data with the management unit.

As shown in FIG. 1, a vehicle 10 of the invention communicates via a gateway or radio interface (wireless interface) 2 with a management unit 1 of the invention, in order to transmit vehicle data from vehicle 10 to management unit 1 or to send data from management unit 1 to vehicle 10. Management unit 1 includes a server, for example, comprises as a module a user portal 11, rights management 12, a controller, an API server 13, and a database 3 where the vehicle data are stored.

Application programs or applications (apps) $App_x$ access the vehicle data via interface 15 of the API server 13 and for their part send data via API server 13 and gateway 2 to the particular vehicle 10.

More precisely stated, vehicle 10 is connected particularly with a mobile communication technology (e.g., UMTS) to management unit 1. The vehicle data of vehicle 10 are accepted within management unit 1 from gateway 2 and managed appropriately within management unit 1, for example, stored in database 3.

Applications $App_1$-$App_4$, who wish to access the individual vehicle data of vehicle 10 (for example, the current vehicle position), can either run within management unit 1 (see $App_4$]), or also outside of management unit 1 (see $App_1$-$App_3$). In so doing, it is possible that applications running within management unit 1 have expanded access options in comparison to applications running externally. In this regard, rights management 12 determines which type of data are provided to a specific application. Vehicle user 4 according to the invention retains full control over his vehicle data. Moreover, the vehicle data can be provided to the applications in an anonymized form via API server 13 or a defined interface 15.

The access of an application to the vehicle data will be explained in the following by way of example.

In a first step, the application registers with API server 13, whereby the application transmits, for example, the following information: The type of data in which the application is interested; A brief description of the application; The URL with which the application can be launched; A mechanism for identifying the vehicle or vehicle user.

In a second step, the usable applications are displayed to a potential vehicle user 4 with the aid of user portal 11. Vehicle user 4 chooses one of these applications and confirms that this application may receive his vehicle data. This decision is communicated to the corresponding application and filed in rights management 12.

Now, the corresponding application can query the corresponding vehicle data via API server 13. In so doing, the application can query the vehicle data either individually per vehicle user 4 or overall for all users registered for this application. In a suitable individual query (query for a vehicle user 4) of an application, rights management 12 checks whether the access rights are present for the corresponding vehicle for this application. In a suitable collective inquiry of an application, rights management 12 determines all users for whom the corresponding application has an access authorization. API server 13 then accesses database 3 to transmit the data requested by the application to the application. The application executes its function (for example, the determination of the parking position of the vehicle), and the vehicle user can access the respective results, for example, via the internet.

If an application would like to transmit additional data to the vehicle, the application indicates during the registration (in the first step) the type of information it would like to send to the vehicle. In the third step, the application transfers the data compiled by it to API server 13. These data are transmitted via gateway 2 to vehicle 10, when rights management 12 has no objections to this transmission.

Subsequently the steps will be described that are necessary for a specific application (in the described embodiment the car finder application) to execute its function.

It can be assumed for this purpose that the online car finder service is provided by a third-party, whereby this service indicates to its users for example on a smartphone, the last parking position of their vehicle, so that the particular vehicle can be found more easily with this information. In order to use the car finder service, the driver first requires an identifier (at the provider) of the management unit. Next, the driver registers with the car finder service, whereby he only needs to provide his management unit identifier (and not the associated password).

The car finder service now contacts the management unit and requests from it that it would like to receive access for the particular driver to the last parking position of his vehicle. To this end, the driver must confirm in management unit 1 that the car finder service may access the last parking position of his vehicle. The vehicle user naturally can also withdraw this approval at any time. Management unit 1 tells the car finder service that driver 4 has granted (or refused) permission to determine the data required by the car finder service. Moreover, management unit 1 configures the vehicle such that the vehicle transmits in each case the last parking position via gateway 2 to management unit 1.

If the particular vehicle has transmitted its vehicle data via defined interface 2 to management unit 1, the car finder service is then provided the current vehicle position via defined interface 15. This can occur passively, i.e., the car finder service must ask management unit 1 periodically whether new data have arrived. The transmission of vehicle data to the car finder service can also occur actively, however, whereby the car finder service provides an interface for management unit 1, to which management unit 1 sends the relevant vehicle data as soon as there are new or changed vehicle data.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A management unit for a vehicle comprising:
a controller;
a wireless interface acquiring data of the vehicle; and
an additional interface, wherein the management unit is configured to access at least one application program via the additional interface,
wherein the management unit is configured to receive as an initial registration of a particular application program:
a first type of the data of the vehicle, which the particular application program requires from the management unit to execute a function, and
a start-up process initiated by the particular application program via which the particular application program is authorized by the vehicle user, wherein after the start-up process the particular application program is registered and given an authorization access via a computer-generated key which allows future access to the management unit, and wherein the authorization access for the particular application program to the data of the vehicle is limited to the first type of the data.

2. A management unit for a vehicle comprising:
a controller;
a wireless interface acquiring data of the vehicle; and
an additional interface,
wherein the management unit is configured to access at least one application program via the additional interface, and
wherein the management unit is configured to receive as a registration of a particular application program of the at least one application program:
a first type of the data of the vehicle, which the particular application program requires from the management unit to execute a function, and
a start-up option for the particular application program via which the particular application program is executable by a vehicle user, wherein the start-up option allows the vehicle user to authorize future access to the first type of data of the vehicle.

3. The management unit according to claim 2, wherein the management unit is configured to execute the method comprising:
transmitting the data of the vehicle via the wireless interface from the vehicle to the management unit;
acquiring, for each of the at least one application program the data of the vehicle from the management unit via an additional interface of the management unit;
executing, via each of the at least one application program, a specific function depending on the data; and
before a first execution of the function, transmitting, via the at least one application program, to the management unit a respective type of data of the vehicle that each of the at least one application program requires from the management unit to execute the specific function and a start-up option for each of the at least one application program via which each of the at least one application program is authorized by a vehicle user.

4. A system having a management unit according to claim 2 and having at least one device comprising the controller and the wireless interface, the wireless interface being configured to send data of the vehicle and to receive additional data, wherein the controller is configured to acquire automatically the data of the vehicle and depending on the additional data received via the wireless interface, to send, via the wireless interface, the additional data.

5. A method for realizing at least one application program for a vehicle, the method comprising:
transmitting data of the vehicle, via a first interface, from the vehicle to a management unit;
acquiring, via of the at least one application program, the data of the vehicle from the management unit via a second interface of the management unit;

executing, via a particular application program of the at least one application program, a function depending on the data acquired, the at least one application program being executed and installed in the vehicle; and before a first execution of the function, transmitting, via the at least one application program, to the management unit a request for a first type of the data of the vehicle that the particular application program having the function requires from the management unit to execute the function, and a start-up option for the particular application program via which the particular application program is authorized by a vehicle user and the request for the first type of the data is granted, wherein, after authorization by the vehicle user through a vehicle interface, the particular application program is authorized to receive the first type of the data of the vehicle from the management unit, and wherein, after authorization, the management unit requests the first type of the data from the vehicle.

6. The method according to claim 5, wherein an access authorization is present for access to the data of the vehicle for each vehicle user who uses one of the at least one application program, and wherein, before accessing the data of the vehicle, the particular application program logs into the management unit with the corresponding access authorization.

7. The method according to claim 6, wherein the access authorization is configurable by the vehicle user, or wherein a collection and sending of the data of the vehicle to the management unit is configurable by the vehicle user.

8. The method according to claim 5, wherein the particular application program in the execution of the function depending on the vehicle data generates additional data, wherein additional data is sent from the particular application program to the management unit that transmits these additional data to the vehicle.

9. The method according to claim 8, wherein the additional data include:
a character string;
a destination for a route of the vehicle;
a position with additional information on a location corresponding to the position;
a music recommendation;
a talk burst; and/or
binary data.

10. The method according to claim 5, wherein, the at least one application program transmits information via the management unit, including additional data that the particular application program sends to the vehicle, during the execution of the function, wherein the additional data includes a description of the particular application program for the vehicle user.

11. The method according to claim 5, wherein the data of the vehicle includes:
a position of the vehicle;
a speed of the vehicle;
a starting position of the vehicle;
a destination position of the vehicle;
a parking position of the vehicle;
a time of arrival of the vehicle;
data on a route traveled by the vehicle;
tank fuel level of the vehicle;
an operating state of the hazard light of the vehicle; and/or
data collected in a system of the vehicle.

12. The method according to claim 5, wherein the function includes:
a search function for finding a current position of the vehicle;
a driver's log book function to create a driver's log book for the vehicle;
a Twitter function depending on a position of the vehicle to send messages about a trip of the vehicle;
a statistics function to record when, where, and how the vehicle was driven;
a parking place recommendation function to recommend a parking place to the vehicle depending on the current position;
a traffic jam warning function in order to warn about a traffic jam depending on the current position of the vehicle and traffic information;
a parking place search function to determine a parking place depending on the time of arrival at a destination;
a location search function to determine intermediate destinations depending on predetermined search criteria and depending on the current position of the vehicle;
a travel guide function to determine, depending on a position of a location, information on the location;
a tank monitoring function to provide refueling recommendations depending on the tank fuel level of the vehicle; and/or
a function that analyzes vehicle data and depending thereon compiles information on the driving behavior.

13. The method according to claim 5, wherein, after start-up, the particular application program is registered with the management unit and given an authorization access.

14. The method according to claim 13, wherein the authorization access is a computer-generated key which allows future access to the management unit.

15. The method according to claim 5, wherein the particular application program is authorized by the vehicle user with a unique identifier or a username and password pair.

16. The method according to claim 5, wherein the start-up option is a process initiated by the particular application program.

17. The method according to claim 5, wherein the start-up option is provided for each of the at least one application program,
wherein, after authorization by the vehicle user through the vehicle interface, each of the at least one application program is authorized to receive only a particular type of the data of the vehicle, needed by a respective function of each of the at least one application program, from the management unit, and
wherein, after authorization, the management unit requests only the particular type of the data from the vehicle needed by each of the at least one application program.

18. The method according to claim 5, wherein the first interface is wireless, and wherein the management unit is a remote management unit.

* * * * *